(12) United States Patent
Duckworth

(10) Patent No.: US 10,745,180 B2
(45) Date of Patent: Aug. 18, 2020

(54) VACUUM WINE BOTTLE STOPPER AND CAP, AND METHOD OF USE

(71) Applicant: David Glenn Duckworth, Irvine, CA (US)

(72) Inventor: David Glenn Duckworth, Irvine, CA (US)

( * ) Notice: Subject to any disclaimer, the term of this patent is extended or adjusted under 35 U.S.C. 154(b) by 2 days.

(21) Appl. No.: 16/256,869

(22) Filed: Jan. 24, 2019

(65) Prior Publication Data

US 2019/0177054 A1 Jun. 13, 2019

Related U.S. Application Data

(63) Continuation-in-part of application No. 15/840,641, filed on Dec. 13, 2017, now Pat. No. 10,611,533.

(51) Int. Cl.
| | |
|---|---|
| *B65D 51/18* | (2006.01) |
| *B65D 81/20* | (2006.01) |
| *B65D 51/24* | (2006.01) |
| *B65B 31/04* | (2006.01) |
| *C12H 1/16* | (2006.01) |

(52) U.S. Cl.
CPC ............ *B65D 51/18* (2013.01); *B65B 31/046* (2013.01); *B65D 51/245* (2013.01); *B65D 81/2038* (2013.01); *C12H 1/16* (2013.01); *B65D 2251/0015* (2013.01); *B65D 2251/0043* (2013.01)

(58) Field of Classification Search
CPC .. B65D 51/18; B65D 51/245; B65D 81/2038; B65D 81/366; B65D 39/0076; B65D 2251/0015; B65D 2251/0043
See application file for complete search history.

(56) References Cited

U.S. PATENT DOCUMENTS

| | | | | |
|---|---|---|---|---|
| 3,009,594 A | ‡ | 11/1961 | Anson ................. | B65D 47/121 215/22 |
| 4,763,803 A | * | 8/1988 | Schneider ............ | B65D 51/165 215/260 |
| 4,989,745 A | * | 2/1991 | Schneider ............ | B65D 79/005 116/270 |
| 5,031,785 A | * | 7/1991 | Lemme ................ | B65B 31/047 141/65 |
| 5,449,079 A | * | 9/1995 | Yang ................... | B65D 81/2038 141/65 |

(Continued)

*Primary Examiner* — Nicolas A Arnett
(74) *Attorney, Agent, or Firm* — David Duckworth

(57) ABSTRACT

A wine bottle stopper is provided including a vacuum stopper and a removable decorative cap. The vacuum stopper includes a central conduit extends longitudinally through the vacuum stopper, and a one-way valve is located within the central conduit. The vacuum stopper includes an upper portion which extends exterior to the wine bottle and a bottom shaft sized for insertion into a wine bottle's opening. The vacuum stopper also has a release valve connected to the one-way valve. Meanwhile, the decorative cap has a sidewall and a top wall forming a central cavity sized to engage and cover the vacuum stopper's upper portion. The central cavity's top wall has a center recess sized and positioned to receive the vacuum stopper's release button. Preferably, the decorative cap includes a decorative feature providing a pleasing appearance.

20 Claims, 11 Drawing Sheets

(56) References Cited

U.S. PATENT DOCUMENTS

| | | | | |
|---|---|---|---|---|
| 5,465,857 A * | 11/1995 | Yang | ............... | B65B 31/047 137/522 |
| 5,535,900 A * | 7/1996 | Huang | ............ | B65B 31/047 137/522 |
| D422,459 S ‡ | 4/2000 | Webb | ............ | D7/625 |
| 7,086,427 B2 * | 8/2006 | Bonich | ............ | B65B 31/047 141/65 |
| D528,367 S ‡ | 11/2006 | McFarlin | ............ | D7/601 |
| 7,198,074 B2 * | 4/2007 | Lemme | ............ | B65B 31/047 141/114 |
| D658,985 S ‡ | 5/2012 | Sadykov | ............ | D9/436 |
| 8,276,625 B2 * | 10/2012 | Dulst | ............ | B65B 31/042 141/19 |
| 8,701,910 B1 * | 4/2014 | Michalopoulos | .. | B65D 81/2038 141/114 |
| 8,967,413 B2 * | 3/2015 | Tinstman | ............ | B65B 31/04 141/65 |
| 9,090,381 B2 ‡ | 7/2015 | Yang | ............ | G06F 13/18 |
| 9,370,791 B1 * | 6/2016 | Nguyen | ............ | F04B 53/127 |
| 9,656,847 B2 ‡ | 5/2017 | Haley | ............ | B64C 3/16 |
| 2005/0178094 A1 ‡ | 8/2005 | Brucart Bonich | .... | B65B 31/047 53/510 |
| 2007/0265587 A1 * | 11/2007 | Chen | ............ | B65D 81/2038 604/319 |
| 2009/0122524 A1 ‡ | 5/2009 | Yang | ............ | B65D 51/245 362/10 |
| 2011/0126939 A1 * | 6/2011 | Luis | ............ | B65B 31/047 141/65 |
| 2011/0220606 A1 * | 9/2011 | Alipour | ............ | B65D 39/0064 215/230 |
| 2013/0153685 A1 * | 6/2013 | Michael J. | ............ | B01F 5/0428 239/428.5 |
| 2014/0263453 A1 ‡ | 9/2014 | Haley | ............ | B65D 39/00 222/15 |
| 2015/0259186 A1 ‡ | 9/2015 | Haley | ............ | B67C 3/16 53/432 |
| 2016/0039584 A1 ‡ | 2/2016 | Verderber | ............ | B65D 51/245 220/21 |
| 2016/0297597 A1 ‡ | 10/2016 | Lee | ............ | B65D 39/0052 |
| 2019/0177054 A1 ‡ | 6/2019 | Duckworth | ............ | B65D 51/18 |

\* cited by examiner

‡ imported from a related application

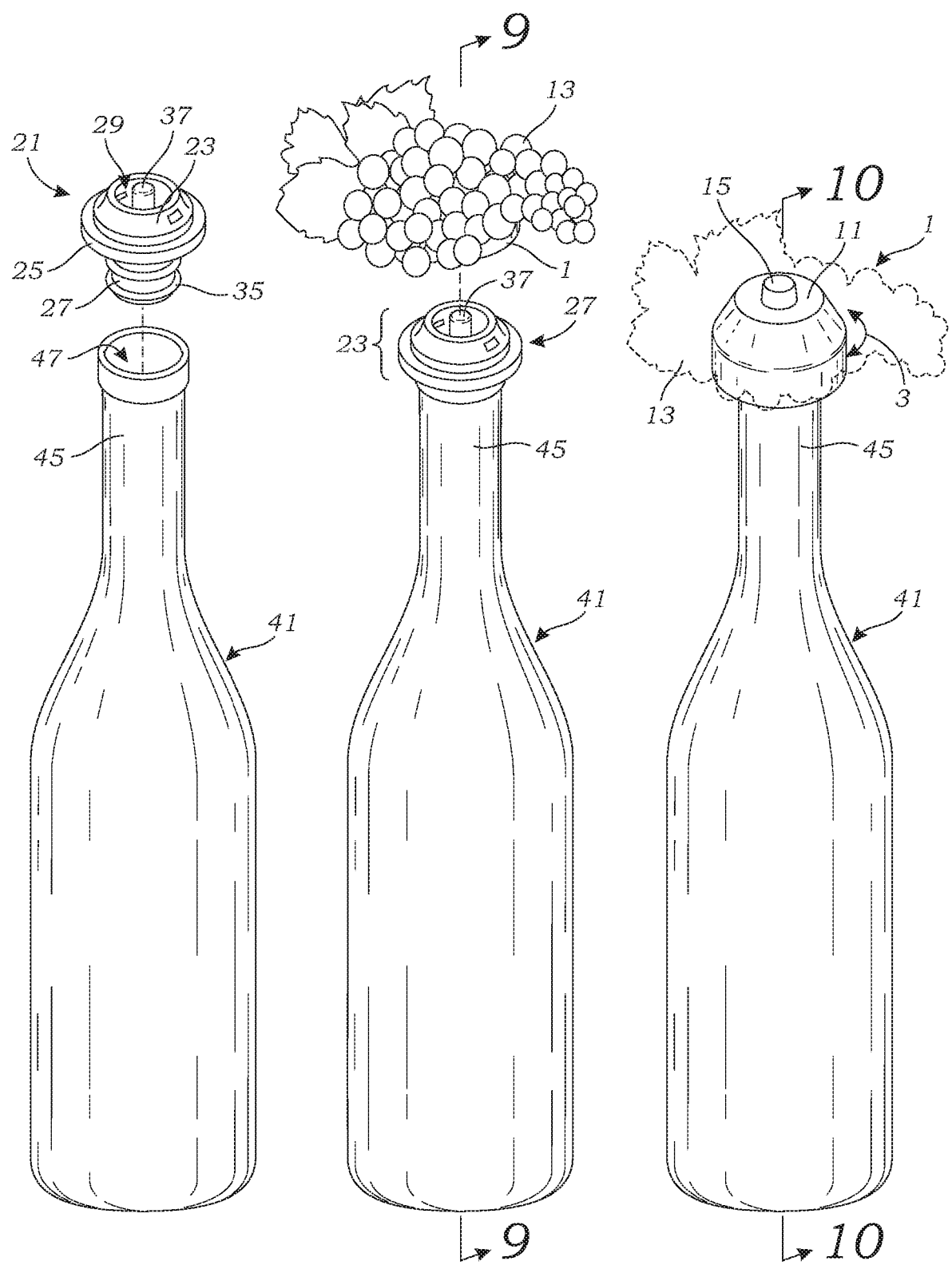

VACUUM WINE BOTTLE STOPPER AND CAP, AND METHOD OF USE

RELATED APPLICATIONS

The present application is a continuation-in-part of co-pending U.S. patent application Ser. No. 15/840,641 filed Dec. 13, 2017.

BACKGROUND OF THE INVENTION

The present invention relates to a wine bottle stopper. More particularly, the present invention relates to a decorative vacuum wine stopper.

Wine is typically bottled in glass bottles having a narrow neck with a central opening. Once filled with wine, a wine bottle is typically sealed with a cork, synthetic cork, or screw top cap. After being bought, the wine bottle is opened by removing the cork or screw top cap. Once opened, air is capable of entering into the bottle which can affect the wine's properties. Typically, exposure of only a few hours is not significant and a small amount of oxygen can actually improve the properties of the wine. However, if the wine is not drunk within a few hours, oxygen from the air can have a harmful effect to the remining wine. This is because the oxygen from the air which has entered the wine bottle will continue to alter the wine's properties over time even if the wine bottle has been sealed relatively rapidly. These harmful effects become more noticeable as time passes and can render the wine undrinkable.

Non-vacuum bottle stoppers have been known for a very long time. Though a bottle stopper may consist of a simple reused cork, very fanciful constructions have also been developed. Fanciful bottle stoppers are particularly desirable when a wine bottle is going to be conspicuously displayed on a countertop or bar after the initial portion of wine has been consumed. Examples of decorative wine bottle stoppers include that described in U.S. Pat. No. D658,985 which illustrates a wine stopper having a tree-shaped appendage, U.S. Pat. No. 3,009,594 which illustrates a decorative balloon construction, U.S. Patent Publication No. 2009/0122524 which includes a lighted snow globe appendage, and U.S. Pat. No. 9,090,381 which also includes an electrically lighted unit. Unfortunately, none of these decorative and fanciful constructions which might be considered pleasing to the eye will extend the life of the wine within the wine bottle.

Various constructions have been introduced to reduce the harmful effects of oxygen upon wine. For example, a wide variety of vacuum stoppers have been developed for sealing a wine bottle which also allows for the evacuation of air from the wine bottle's interior. A typical vacuum stopper includes a lower neck portion and an upper portion. The neck portion is typically cylindrical and sized for insertion into the circular opening of a wine bottle's neck. In addition, the neck portion typically includes ribs for providing a gaseous-type seal between the vacuum stopper's neck portion and the wine bottle's neck. Meanwhile, the vacuum stopper's upper portion typically has a shape which is too large to enter into the wine bottle's circular opening. In addition, the vacuum stopper includes a longitudinally extending conduit which extends entirely through the vacuum stopper's upper portion and lower portion. A one-way valve is located within the conduit which allows air to leave the wine bottle's interior, but not enter into the wine bottle. Once the wine bottle stopper's neck has been positioned within a wine bottle's circular opening, a pump is used to evacuate air from the wine bottle's interior.

Advantageously, vacuum wine stoppers can substantially extend the drinking life of the wine within a wine bottle. Disadvantageously, vacuum wine stoppers are typically ugly utilitarian constructions.

Thus, there exists a need for an improved vacuum wine stopper which has a pleasing appearance.

SUMMARY OF THE INVENTION

The present invention is directed to an improved wine bottle stopper for a wine bottle. The wine bottle stopper includes a traditional vacuum stopper and a removeable cap. The vacuum stopper is constructed in any manner as is readily available. To this end, the vacuum stopper includes both a neck portion and an upper portion which extends upwardly above the neck portion. A conduit extends longitudinally through the entire vacuum stopper's neck portion and upper portion. The one-way valve is located within the central conduit which freely permits the flow of air as received by the conduit at the bottom of the neck portion to be expelled from the top of the vacuum stopper's upper portion. The neck portion has a diameter capable of entering and providing a gaseous seal with a wine bottle's circular opening. Since a 750 ml wine bottle typically has a ¾ inch opening, it is preferred that the vacuum stopper's neck portion has a diameter of ¾ inch or slightly larger. For slightly larger wine bottles having openings of ⅞ inch or 15/16 inch openings, it is preferred that the vacuum stopper's neck portion is sized accordingly to have a neck portion of the same diameter or slightly larger so as to form a gaseous-tight seal. Meanwhile, the vacuum stopper's upper portion is sized so as to be too large so as to enter into the bottle's circular opening. The upper portion may have a round or square shape, and includes a laterally extending rim having a diameter, or other dimensions, too large to enter into the bottle's circular opening.

The removable cap is sized for engaging and covering the vacuum stopper's upper portion. To this end, the cap has a top and a sidewall which extends downwardly from the cap's top. The cap's top and sidewall form a central cavity which is sized to entirely accept the vacuum stopper's upper portion. Where the vacuum stopper includes a top vacuum release button, the cap's top wall preferably includes a recess sized and positioned to accept the release button with the cap has been placed upon the vacuum stopper. Preferably, the cap's sidewall is sized and shaped to form a press-fit engagement with the vacuum stopper's upper portion's rim.

In a first embodiment, the cap's cavity's height is sufficient so that when the cap is placed upon a vacuum stopper, the cap's sidewall covers the vacuum stopper's rim without extending below the rim. In an alternative embodiment, the cap's cavity and corresponding sidewall are sized to receive the vacuum stopper's upper portion with the cap's sidewall extending downwardly below the rim so as to partially cover the top of a wine bottle's neck without covering the wine bottle's neck in its entirety. Furthermore, where the wine bottle's neck has a diameter greater than the diameter of the vacuum stopper's rim, preferably the cap's cavity's opening has a diameter greater than cavity's diameter nearer to the cavity's top wall. More specifically, for this embodiment, the cavity has a stepped construction including two cylindrical sections including an upper cylindrical section sized to accept and cover the vacuum stopper's rim and a lower cylindrical section which has a diameter greater than the upper cylindrical section's diameter so as to extend below the upper cylindrical section to at least partially cover the wine bottle's neck.

After a wine bottle has been opened by removing its cork or twist cap, a vacuum stopper is inserted into the wine bottle's circular opening. This is accomplished by inserting the vacuum stopper's neck portion into the wine bottle's circular opening until the vacuum stopper's upper portion engages the wine bottle's circular opening. A pump is connected to the vacuum stopper's upper portion and operated to evacuate air from the wine bottle's interior. Once the pump is removed from the vacuum stopper's upper portion, the one-way valve and gaseous-tight seal between the vacuum stopper's neck portion and wine bottle's neck prevents air from unwantingly entering into the wine bottle's chamber. Thereafter, the removable cap is placed upon the vacuum stopper's upper portion so as to completely encapsulate it.

To access the wine again, these steps are simply reversed. The removeable cap is pulled from the top of the vacuum stopper's upper portion. Thereafter, the vacuum stopper is pulled from the wine bottle's neck. The vacuum stopper may or may not include a trigger or button for deactivating the one-way valve to allow entry of air into the wine bottle to facilitate the removal of the vacuum stopper from the wine bottle.

Advantageously, the removable cap may incorporate a wide variety of decorative features including fanciful colors and decorative shapes to provide an infinite number of artistic creations all of which will completely cover the unattractive vacuum stopper which extends from the top of the wine bottle. Various modifications of the vacuum stopper and wine bottle combination can be made. For example, the vacuum stopper's rim and removable cap's sidewall may be circular. Alternatively, the vacuum stopper's upper portion may be constructed in various shapes such as a square such as to accept a removeable cap having a square sidewall. In an additional preferred embodiment, the vacuum stopper's rim and removable cap's sidewall are sized and shaped to provide a gaseous-tight seal so as to provide an extra level of protection against unwanted air entering into a wine bottle's interior.

Advantageously, the vacuum stopper and decorative cap provide a more pleasing appearance for sealing a previously opened wine bottle while not covering the wine bottle's barrel and label attached thereon.

Advantageously, the vacuum stopper and decorative cap may also provide a redundant gaseous seal for a vacuum stopper.

Other features and advantages of the present invention will be appreciated by those skilled in the art upon reading the detailed description which follows with reference to the attached drawings.

BRIEF DESCRIPTION OF THE DRAWINGS

FIG. 3 is a perspective view illustrating insertion of a vacuum stopper into a wine bottle's circular opening;

FIG. 4 is a perspective view illustrating a vacuum stopper within a wine bottle, and application of a removable cap upon the vacuum stopper;

FIG. 5 is a perspective view illustrating a removeable cap upon a vacuum stopper which has been inserted into a wine bottle's circular opening;

DETAILED DESCRIPTION OF THE INVENTION

Figure 1:
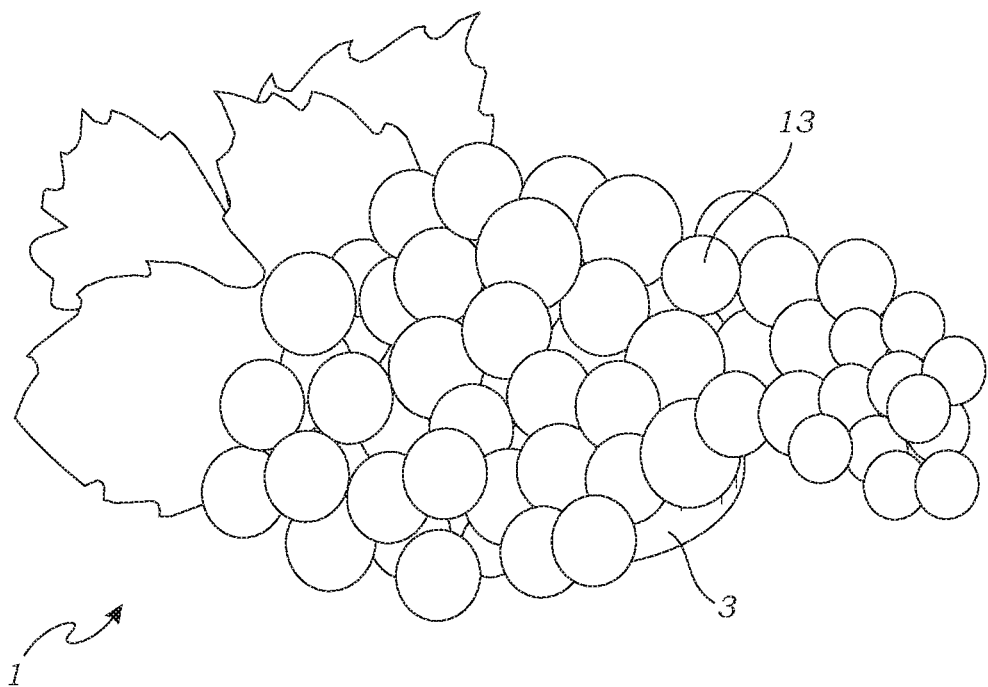
FIG. 1 is a top perspective view of a removable cap for engaging and covering a vacuum stopper of the present invention.
Figure 2:
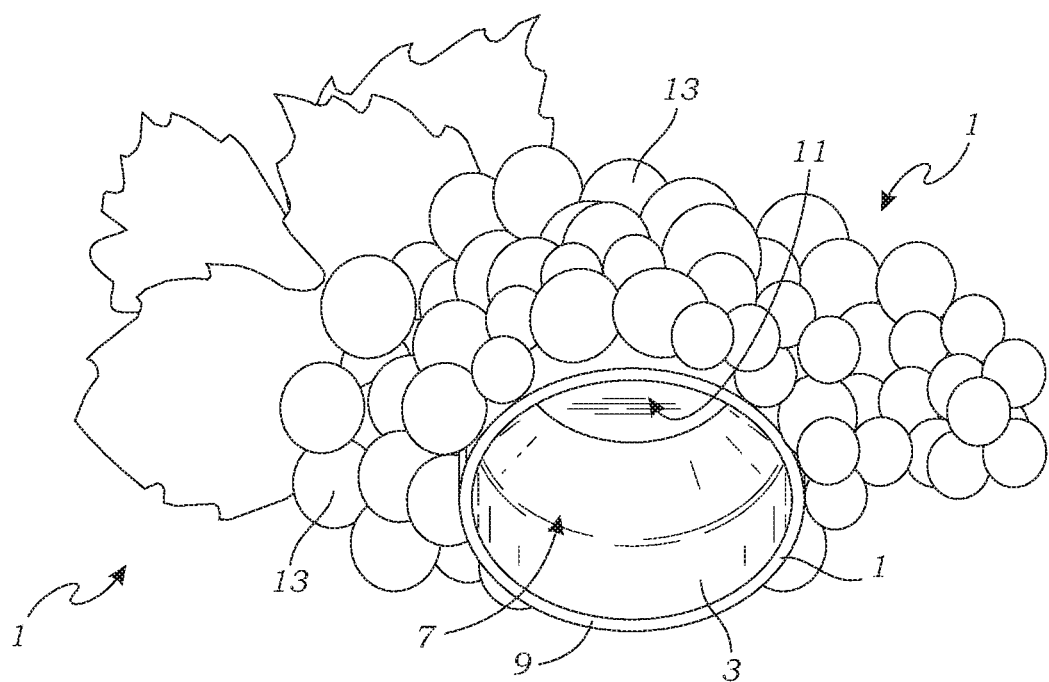
FIG. 2 is a bottom perspective view of a removeable cap for engaging and covering a vacuum stopper of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to FIGS. 1-27, the wine stopper assembly is provided for sealing a traditional wine bottle 41 having a barrel shaped body 49 where a label is typically attached, a tapered neck portion 45, and a circular opening 47. The wine stopper assembly includes a vacuum stopper 21 and a removeable cap 1. With reference to FIGS. 3-10; 15-22; and 26-27, the vacuum stopper 21 is preferably of a traditional construction including an upper portion 23 and a bottom neck portion 27. A central conduit 29 extends longitudinally from the bottom of the shaft portion 27 to the top of the upper portion 23. In addition, the vacuum stopper 21 includes a one-way valve 33 located within the central conduit 29 which is intended to allow air to escape from the interior of a wine bottle 41 to be expelled through one or more outlets 31 at the top of the vacuum stopper 21, but is closed to prevent air from passing downward through the vacuum stopper to allow air into the wine bottle's interior. As illustrated in the Figures, the vacuum stopper 21 may include a release button 37 which projects from the stopper's top. The release button 37 is connected to the one-way valve 33 and actuation of the release button 37 causes the one-way valve to open, so as to release the vacuum and allow air to pass downwardly through the central conduit 29 into the previously evacuated bottle 41. Typically, the release button 37 is actuated by diverting the release button 37 to the side, but other constructions can be developed by those skilled in the art.

The vacuum stopper's neck portion 27 is sized to enter a wine bottle's circular opening 47 and form a press-fit engagement with the wine bottle at the wine bottle's neck 45. The diameter of the vacuum stopper's shaft 27 may be any size so as to form a press-fit engagement with a wine bottle's opening 47. Preferably, the vacuum stopper's neck portion 27 includes one or more circular ribs 35 which radially project from the neck portion 27 to provide additional engagement with the interior of the bottle's neck 45. For example, the opening of a standard 750 ml wine bottle is ¾ of an inch, and thus a preferred diameter of the wine bottle's neck portion is preferably approximately ¾ of an inch or slightly larger. Similarly, for wine bottles with larger openings, such as typically accepting a size #8 or size #9 cork, preferably has a ⅞ inch diameter or 15/16 inch diameter, or slightly larger. Of course, wine bottles with either smaller or larger openings 47 would preferably accept a vacuum stopper 21 with correspondingly smaller or larger diameter neck portions 27.

Figures 15, 16:
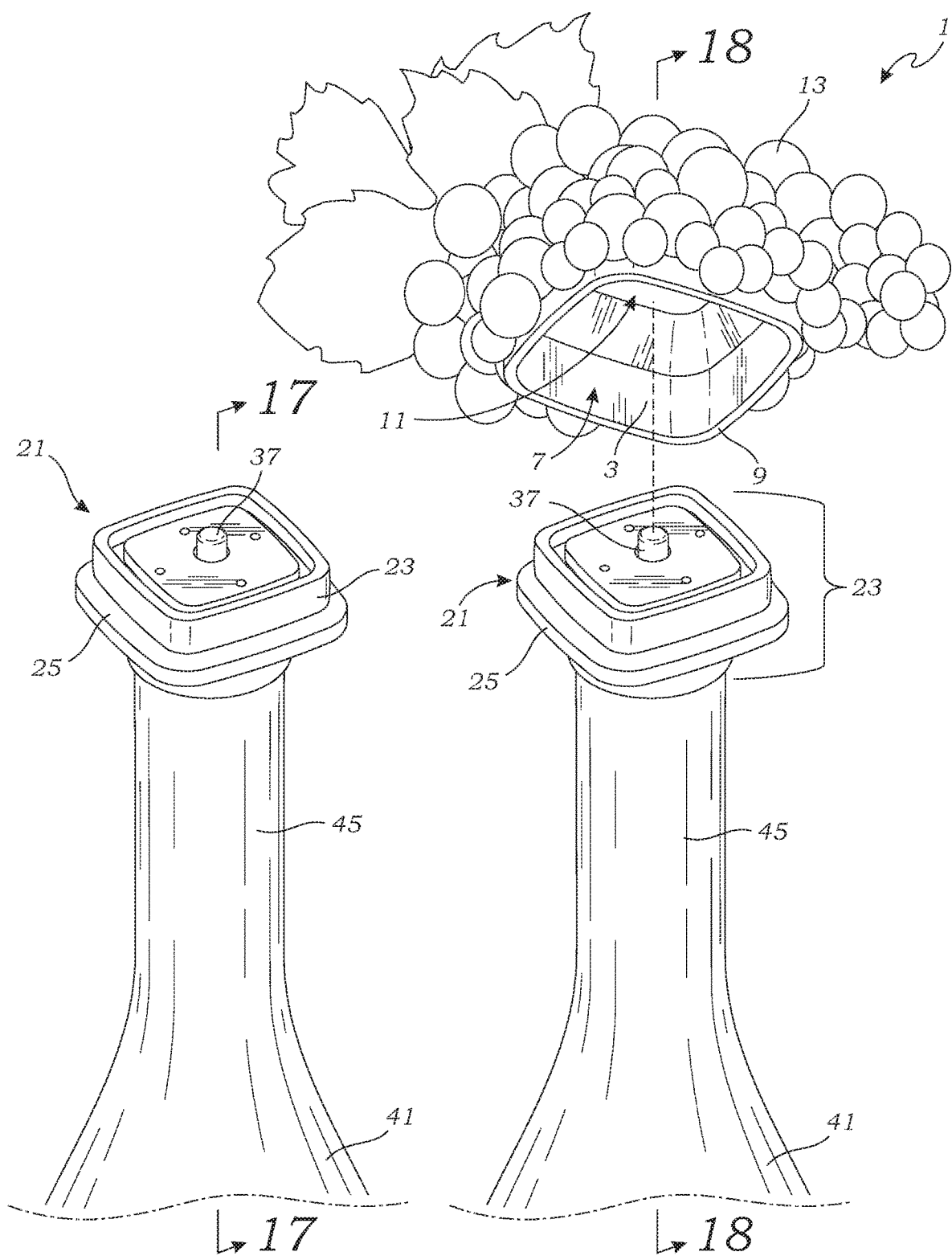
FIG. 15 is a top perspective view illustrating a vacuum stopper having a square rim wherein the vacuum stopper's neck portion has been inserted into a wine bottle's circular opening.
FIG. 16 is a perspective view illustrating the vacuum stopper and wine bottle illustrated in FIG. 15 with a removeable cap about to be applied to engage and cover the vacuum stopper's upper portion.

With reference to FIGS. 3-10, the vacuum stopper 21 has an upper portion 23 having a diameter too large to enter into the wine bottle's opening 47. As illustrated in the Figures, the vacuum stopper's upper portion 23 includes a rim 25 which extends radially beyond the wine bottle's opening 47 for preventing the vacuum stopper's upper portion 23 from inadvertently entering into the bottle's neck 45. Preferably, the bottom of the rim 25 also provides a gaseous-tight seal where it engages the top of the wine bottle 41. The vacuum stopper's upper portion 23 and corresponding rim 25 can take various shapes and forms as can be determined by those skilled in the art. As illustrated in FIGS. 3-10, a preferred embodiment of the vacuum stopper's upper portion 23 has a round shape. However, as illustrated in FIGS. 15 and 16, the upper portion can take any number of shapes including square.

With reference to FIGS. 1, 2, 4, 5 and 11-14, the wine bottle stopper of the present invention includes a removeable cap 1 includes a top wall 11 and a sidewall 3 forming a cavity 7. The removable cap's sidewall 3 and cavity 7 are sized to entirely accept the vacuum stopper's neck portion 23 within the cap's cavity 7. Accordingly, preferably the removeable cap's cavity and sidewall 3 are dimensioned so as to accept in a press fit manner the upper portion's rim 25. Furthermore, preferably the removable cap's sidewall has a height 8 sufficient to entirely cover the vacuum stopper's neck portion's rim 25.

Figure 10:
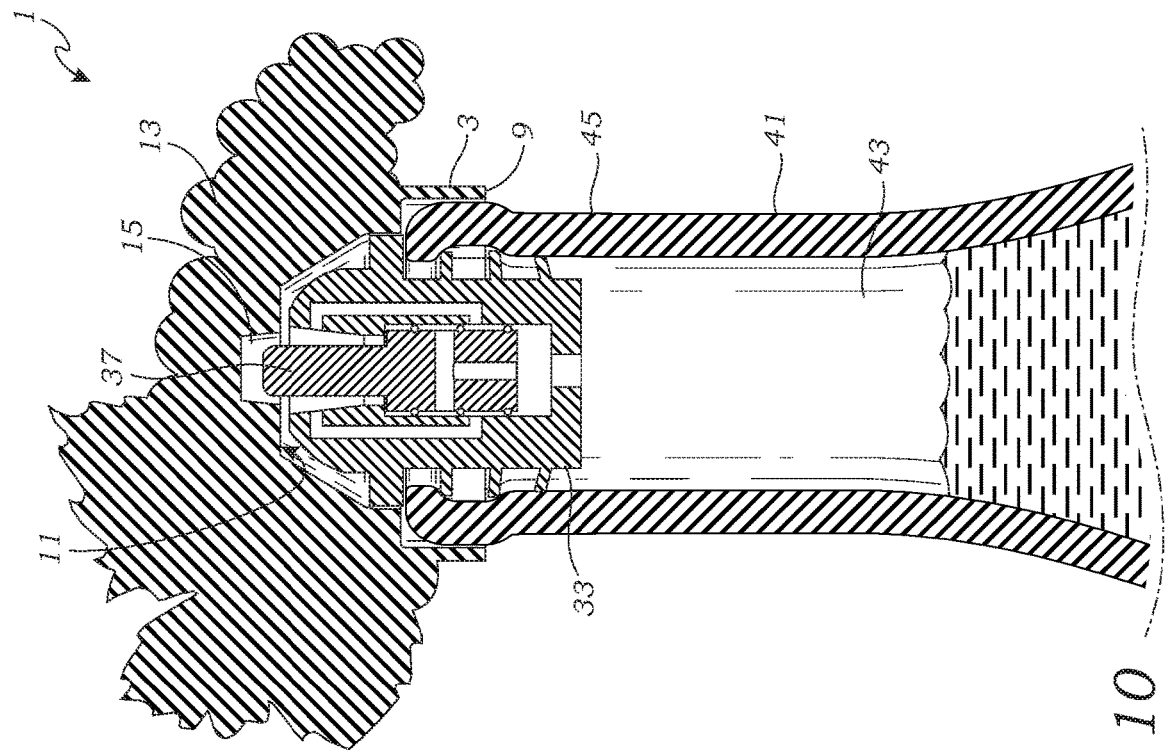
FIG. 10 is a side cross-sectional view illustrating a removable cap engaging and covering a vacuum stopper within a wine bottle wherein the wine bottle's neck has a diameter greater than the diameter of the vacuum stopper.
Figure 9:
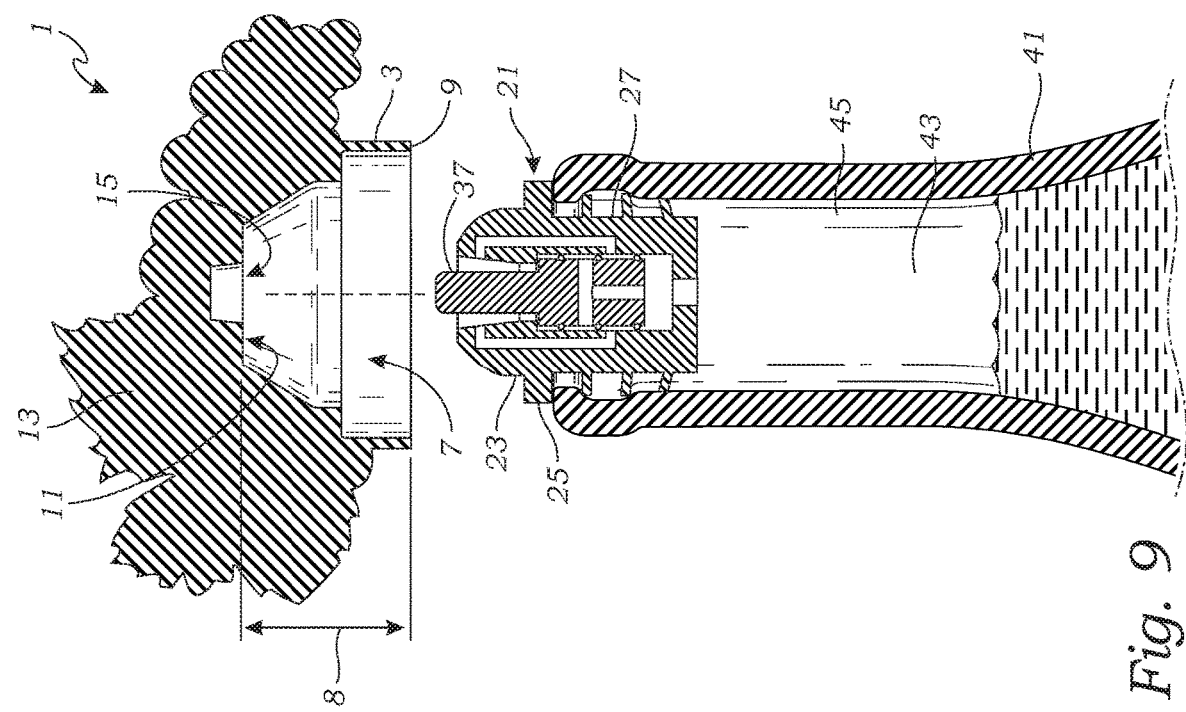
FIG. 9 is a side cross-sectional view illustrating a removable cap being applied to the upper portion of a vacuum stopper which has already been inserted into a wine bottle wherein the wine bottle's neck has a diameter greater than the diameter of the vacuum stopper.
Figure 11:
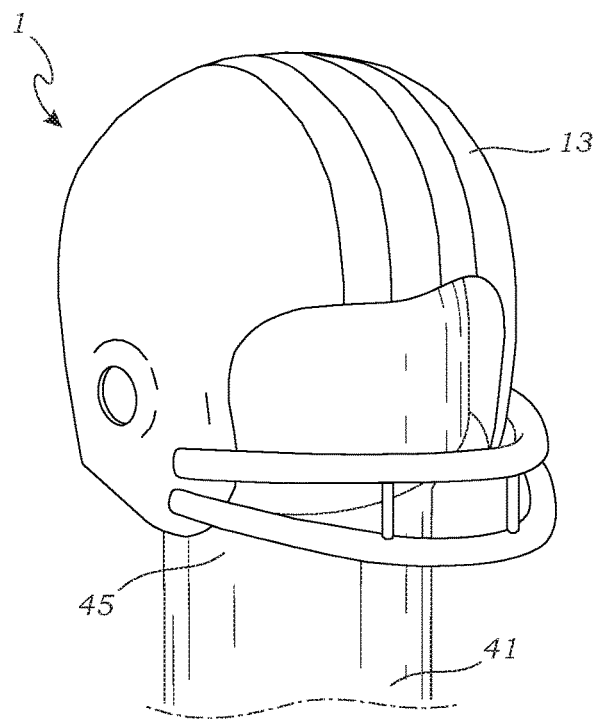
FIG. 11 is a perspective view illustrating an alternative embodiment of a removeable cap engaging in covering a vacuum stopper's upper portion.
Figure 12:
FIG. 12 is still an additional embodiment of the removeable cap in engaging in covering a vacuum stopper's upper portion.
Figure 13:
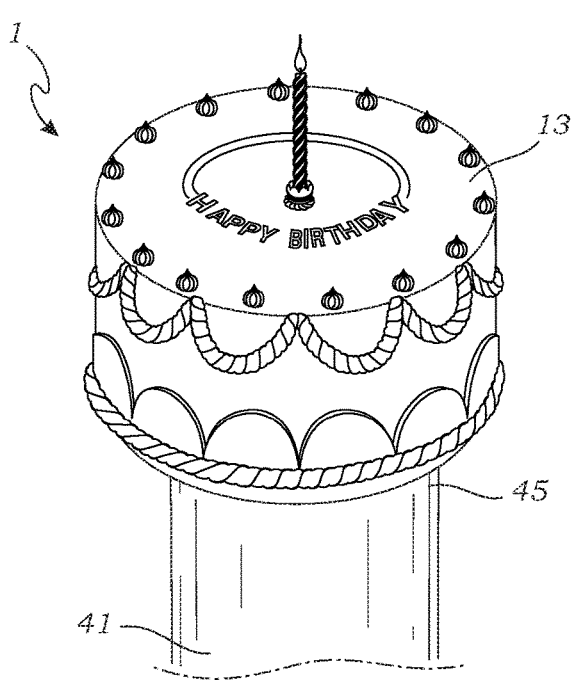
FIG. 13 is still an additional embodiment of the removeable cap in engaging in covering a vacuum stopper's upper portion.
Figure 14:
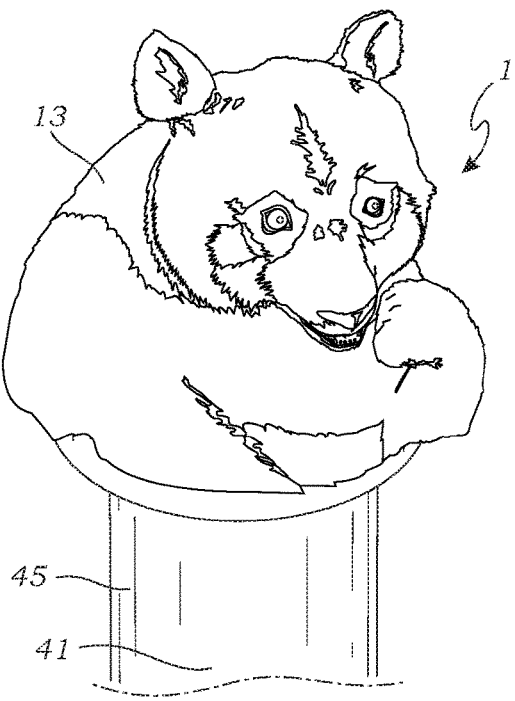
FIG. 14 is still an additional embodiment of the removeable cap in engaging in covering a vacuum stopper's upper portion.

The replaceable cap's cavity's top wall may be planar. However, as best illustrated in FIGS. 9-10; 17-18; 21-22; and 26-27, the cavity's top wall 11 for includes a center recess 15. The center recess 15 is preferably circular and is positioned and sized to receive the vacuum stopper's release button 37 when the cap 1 is placed upon the vacuum stopper 21. Preferably, the circular recess 15 is sufficiently large so as to prevent the cap's top wall 11 from undesirably engaging the top or even the sides of the release button 37 which would inadvertently release the vacuum within a wine bottle, even after the vacuum stopper 21 has been inserted as far as possible into the cavity 7. Alternatively, the circular recess 15 is sized and shaped in manner wherein the sides of the recess 15 engage the sides of the release button 37 to maintain the release button 37 in the center of the vacuum stopper 21 to prevent the release button 37 from being deflected to the side, even after the vacuum stopper 21 has been inserted as far as possible into the cavity 7. This construction prevents the release button 37 from being activated which would unwantingly release the vacuum within the wine bottle. More specifically, preferably, the cavity 7 is constructed to accept a vacuum stopper's release button 37 within the cavity's recess 15, even after the vacuum stopper 21 has been inserted as far as possible into the cavity 7, in a manner that either the cavity's top wall 11 is unable to engage the release button, or the top wall engages the sides of the release button in a manner that prevents the release button 37 from being inadvertently diverted to the side which would cause air to enter into the wine bottle.

As illustrated in the Figures, the cavity 7 may be constructed in various shapes. For example, FIGS. 9 and 10 illustrate a first embodiment wherein the cavity 7 has two cylindrical sections including a bottom cylindrical section and an upper cylindrical section, a frusto-conical middle section, and a cylindrical recess 15 upper section. The cavity's cylindrical bottom section has a size and shape to accept a wine bottle's neck 45; the cavity's cylindrical intermediate section has a size and shape to accept a vacuum stopper's rim 25; the cavity's frusto-conical section has a size and shape to accept the vacuum stopper's upper portion 23; and the cavity's recess 15 has a size and shape to accept the vacuum stopper's release button 37 without the release button 37 engaging the replaceable cap 1. In a preferred embodiment, the upper cylindrical section's diameter is 1.25 inches to receive a vacuum stopper's rim 25 having a diameter of 1.25 inches, and the lower cylindrical section's diameter is 1.5 inches to a accept wine bottle having a neck up to 1.5 inches in diameter. Of course, the dimensions of the cavity's cylindrical sections may vary depending on the diametrical dimensions of the vacuum stopper's rim and wine bottle's neck.

Figure 17:
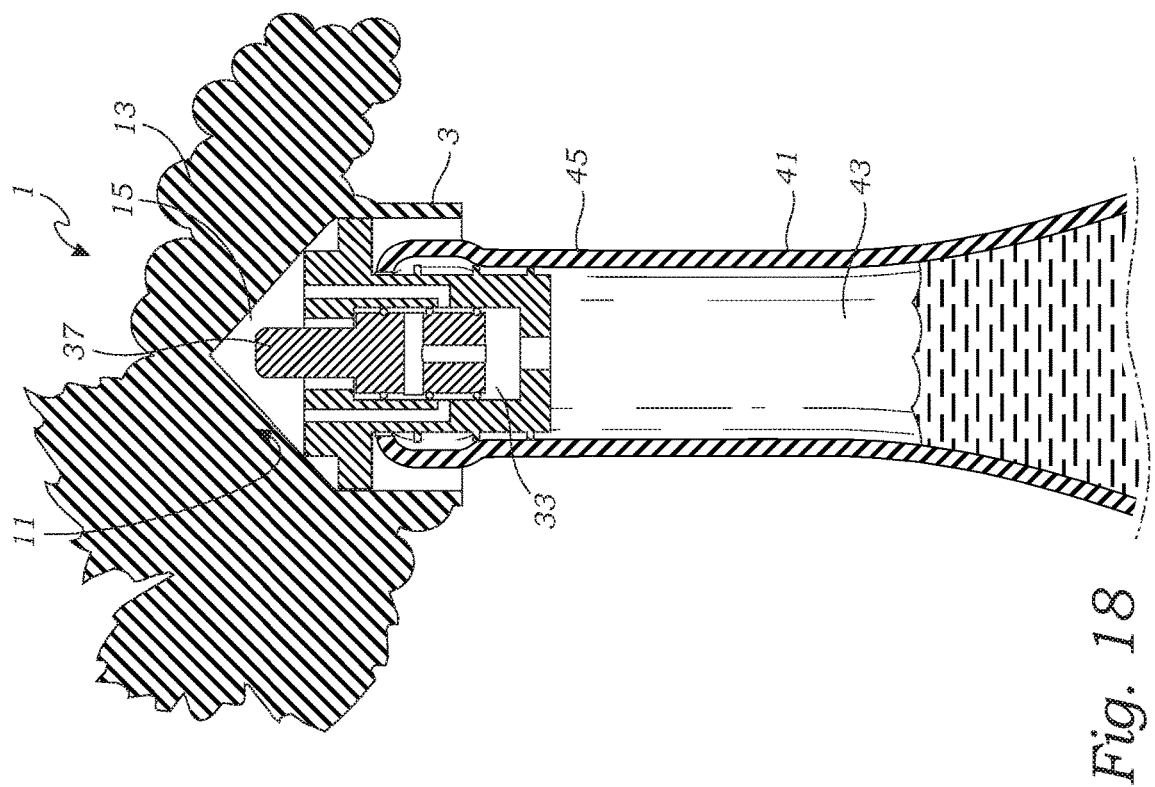
FIG. 17 is a side cross-sectional view illustrating a removable cap being applied to the upper portion of a vacuum stopper which has already been inserted into a wine bottle.
Figure 18:
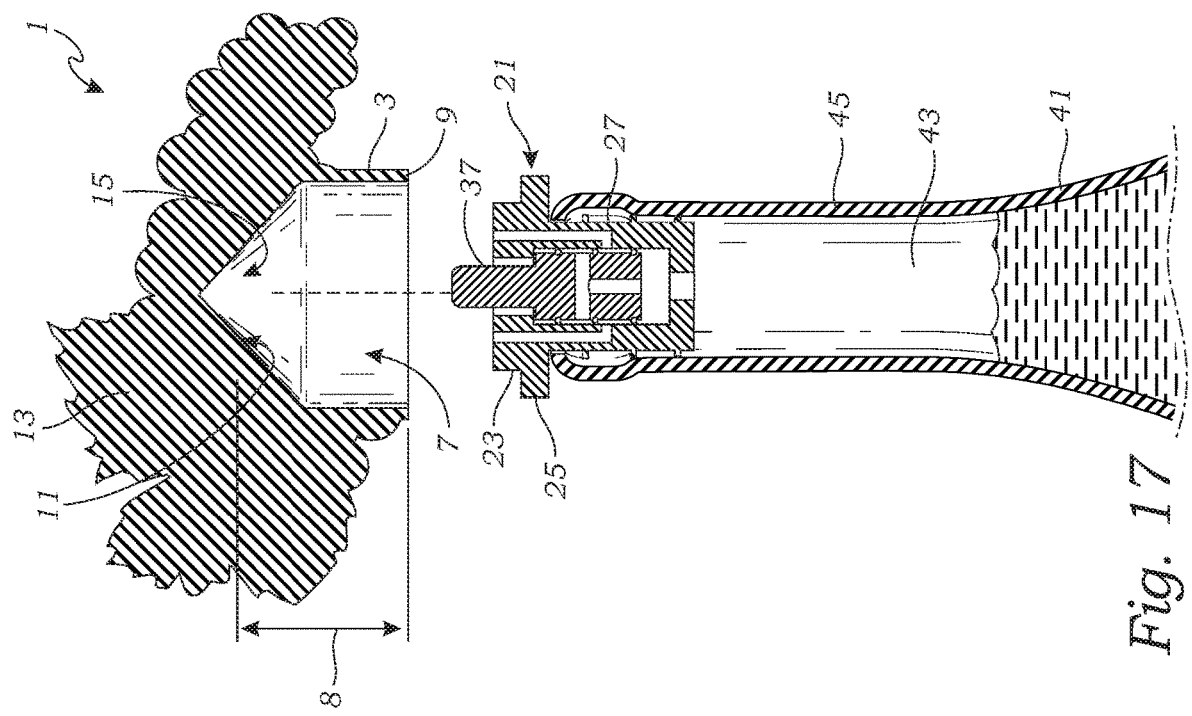
FIG. 18 is a side cross-sectional view illustrating a removable cap engaging and covering a vacuum stopper within a wine bottle.
Figure 19:
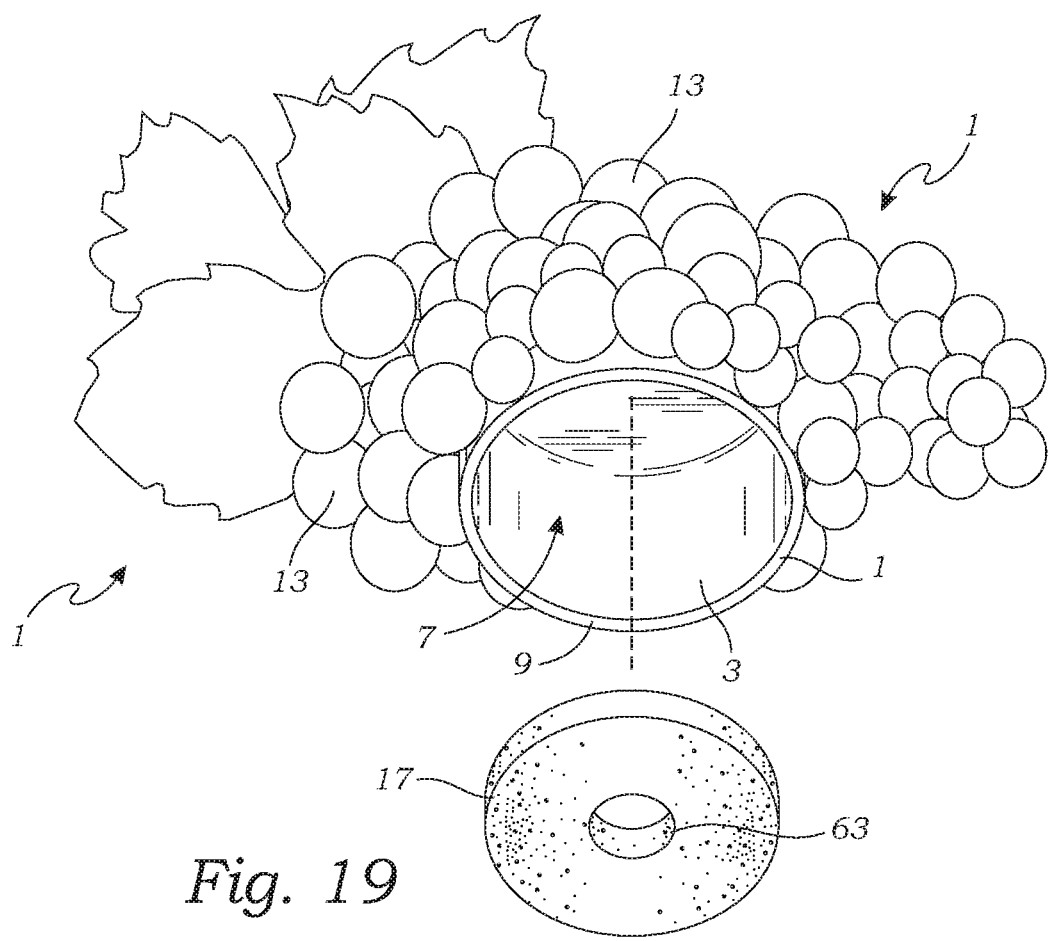
FIG. 19 is a bottom perspective view of a removeable cap with a ring for use within the removable cap's cavity.
Figure 20:
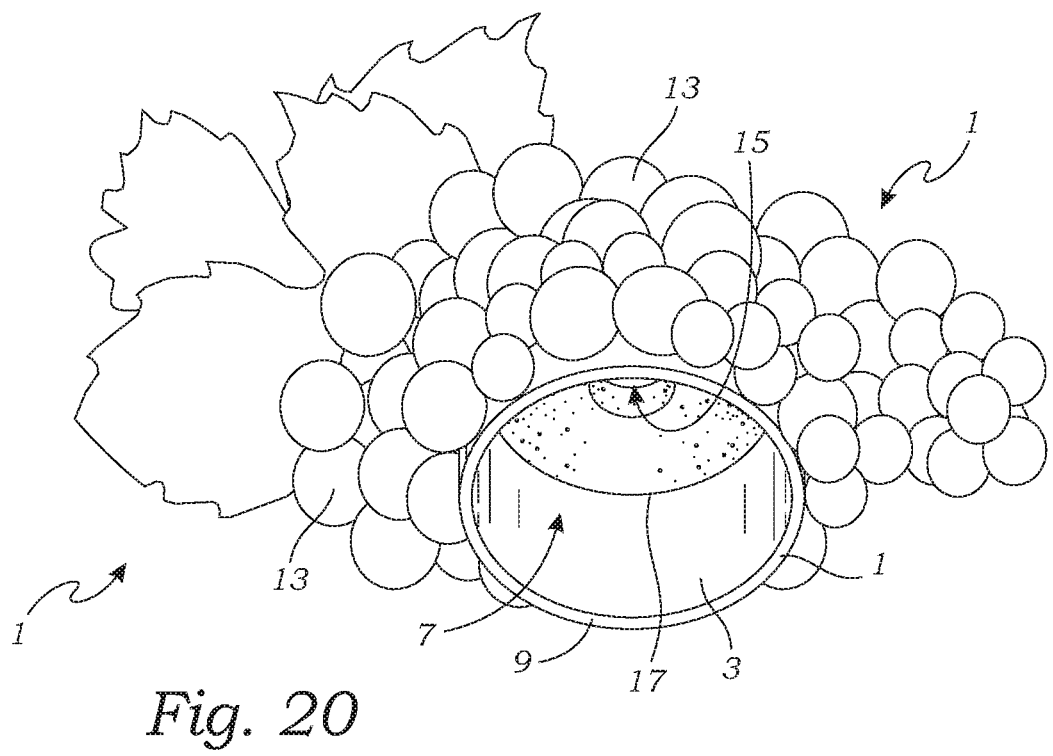
FIG. 20 is a bottom perspective exploded view of a removeable cap with a ring for use within the removable cap's cavity.
Figure 22:
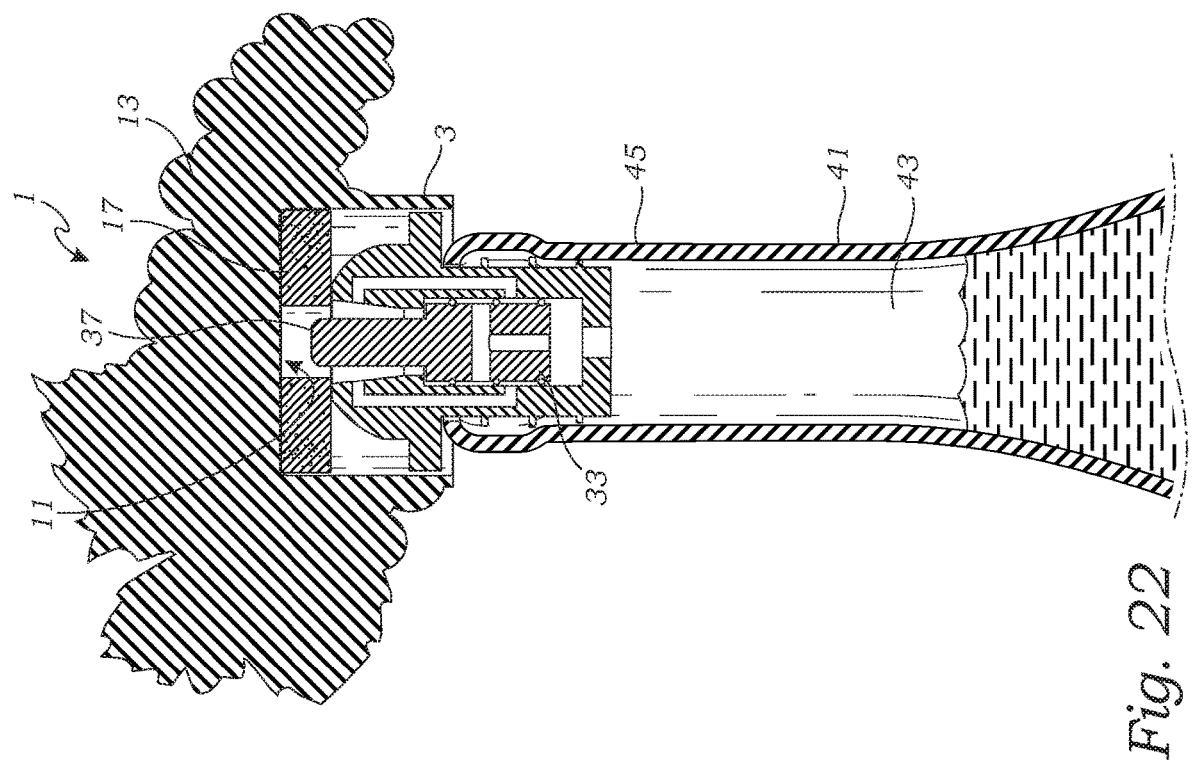
FIG. 22 is a side cross-sectional view illustrating a removable cap with an internal ring forming a recess with the cap engaging and covering a vacuum stopper within a wine bottle.
Figure 21:
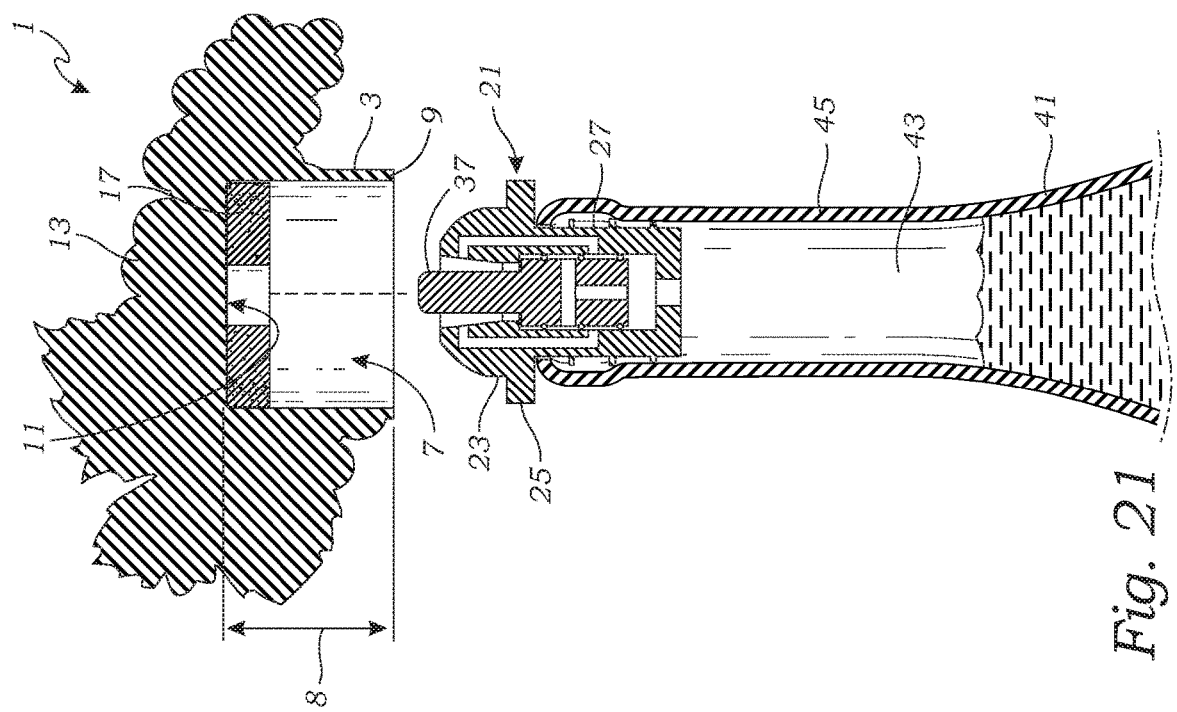
FIG. 21 is a side cross-sectional view illustrating a removable cap with an internal ring forming a recess being applied to the upper portion of a vacuum stopper which has already been inserted into a wine bottle.

In a second embodiment illustrated FIGS. 17 and 18, the replaceable cap's cavity 7 has a cylindrical bottom section, and a conical upper section which forms the recess 15. Like the embodiment shown in FIGS. 9 and 10, the cavity's cylindrical bottom section has a size and shape to accept a vacuum stopper's rim 25. In addition, the cavity's top wall forms a conical recess 15 having a size and shape to accept the vacuum stopper's release button 37 without the release button 37 engaging the replaceable cap 1.

In still an additional embodiment illustrated in FIGS. 19-22, the replaceable cap 1 includes a cylindrical chamber, which longitudinally larger than the cavity 7 and encompasses the cavity 7. In addition, the replaceable cap 1 includes a ring 17 positioned within the chamber to form the cavity 7 which is cylindrical and sized for accepting the vacuum stopper's rim 25 and upper portion 23. In addition, the ring 17 includes a center hole 63 which forms the recess 15 for receipt of a vacuum stopper's release button 37. As illustrated, the center hole 63 preferably has a diameter and depth sufficient to accept the vacuum stopper's release button 37 without the release button 37 engaging any part of the replaceable cap 1.

In still additional embodiments illustration in FIGS. 23-27, the replaceable cap 1 includes an insert 61 which forms the cavity 7. For these embodiments, the replaceable cap 1 includes a chamber which is diametrically longitudinally slightly larger than the intended cavity 7. As illustrated in FIGS. 23-27, the insert 61 is positioned within the chamber. In addition, the insert 61 includes the cavity 7 so that the insert 61 forms an intermediate liner between the chamber's sidewall and the vacuum stopper 21. To this end, the insert 61 has exterior dimensions intended to fill the replaceable cap's larger chamber, and the insert 61 includes the cavity 7 sized and shaped similarly to other embodiments to receive the vacuum stopper's upper section 23, preferably in a press-fit engagement with the vacuum stopper's rim 25. The insert 61 may be affixed within the replaceable cap's cavity using an adhesive, a press-fit engagement with the chamber sidewall, or by employing another fastener as can be determined by one skilled in the art. The insert 61 may be constructed of various materials including hard materials such as stone, glass, steel, or metal. However, it is preferred that the insert be made of rubber or a soft malleable foam such as polyurethane foam, memory foam, open cell foam, and closed cell foam.

Figure 23:
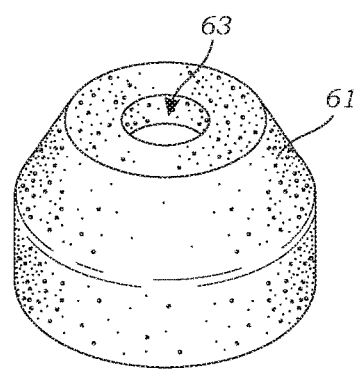
FIG. 23 is a top perspective view of an insert for use with a removeable cap.
Figure 24:
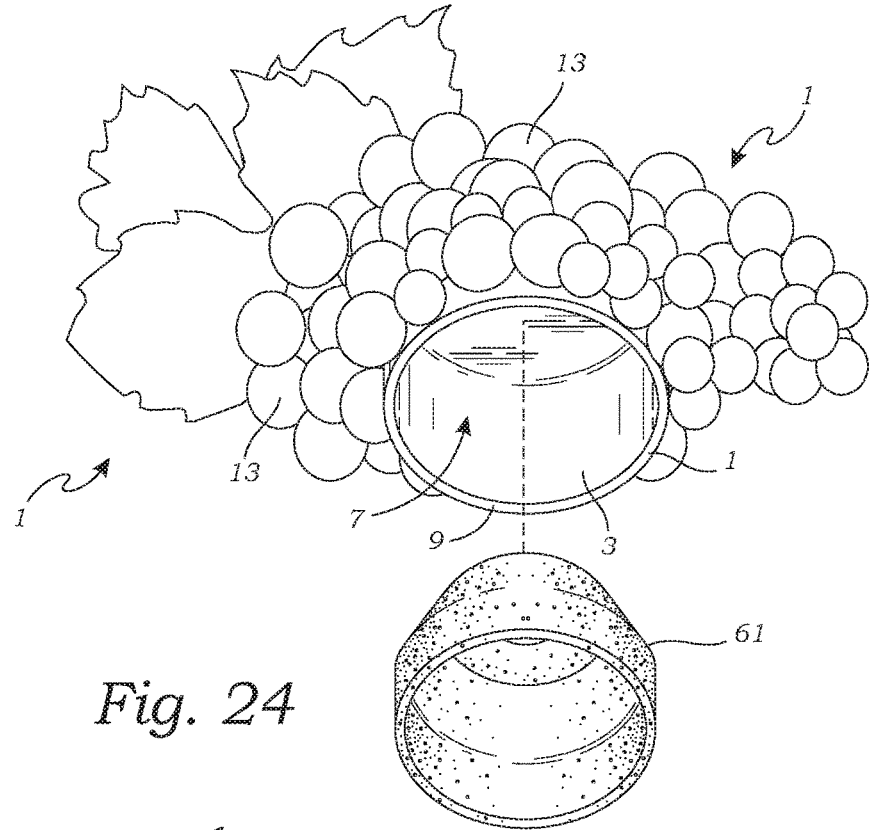
FIG. 24 is a bottom perspective exploded view of a removeable cap with an insert shown in FIG. 23.
Figure 25:
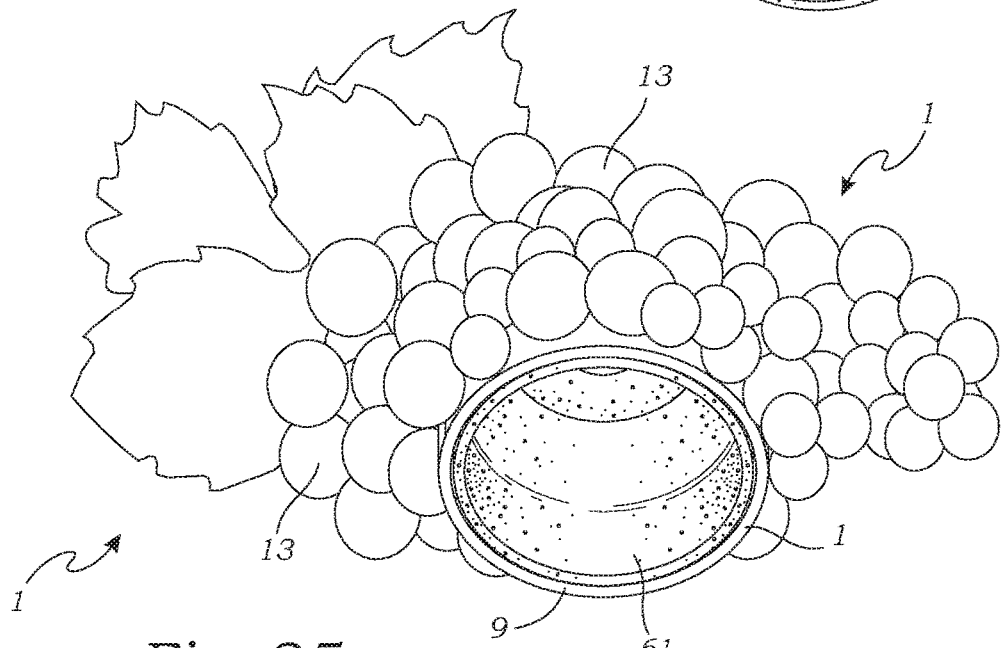
FIG. 25 is a bottom perspective view of a removeable cap with an insert shown in FIG. 23.

With reference to FIGS. 23-25, in a preferred embodiment including an insert, the replaceable cap 1 has a chamber which is diametrically and longitudinally larger than the vacuum stopper's upper section 23. The chamber has a cylindrical bottom section and a frusto-conical upper section. For this embodiment, the insert 61 has a uniform thickness and a corresponding shape to form a cavity 7 having a cylindrical bottom section and a frusto-conical upper section to accept a vacuum stopper 21. In addition, the insert 61 includes a hole 63 which forms a recess for receipt of the vacuum stopper's release button 39.

Figure 26:
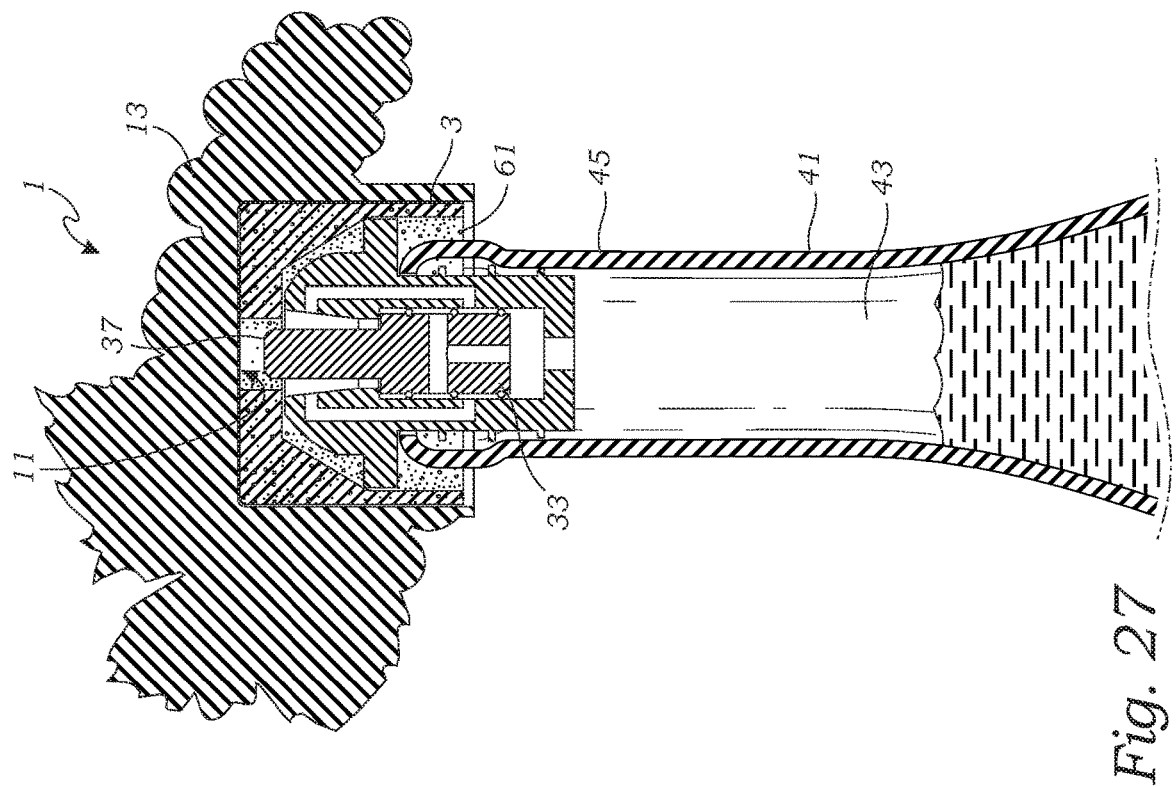
FIG. 26 is a side cross-sectional view illustrating a removable cap with an insert having a central cavity being applied to the upper portion of a vacuum stopper which has already been inserted into a wine bottle.
Figure 27:
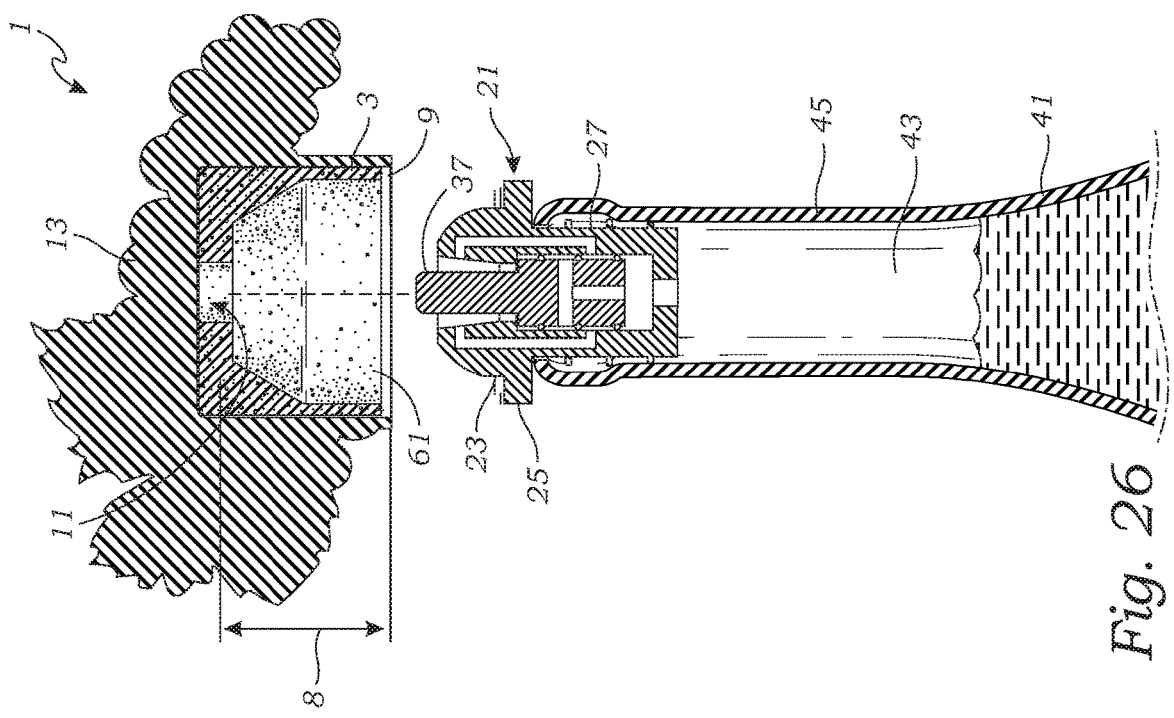
FIG. 27 is a side cross-sectional view illustrating a removable cap with an insert with the cap engaging and covering a vacuum stopper within a wine bottle.

In a similar embodiment shown in FIGS. 26 and 27, the replaceable cap 1 has a cylindrical chamber which is diametrically larger than the vacuum stopper's upper section 23. An insert 61 is located within the chamber, and the insert 61 has a correspondingly cylindrical exterior which fills the chamber. Like the embodiment shown in FIGS. 23-25, the insert 61 shown in FIGS. 26 and 27 has a cavity 7 and top hole having a corresponding shape to accept a vacuum stopper 21 with the vacuum stopper's button projecting into the top hole.

The removeable cap 1 cavity may have a size to that, when mated to the vacuum stopper 21, the removable cap's sidewall 3 has a height 8 sufficient to cover the vacuum stopper's upper portion's rim without extending below the rim 25. However, in the preferred embodiments including the embodiment illustrated in FIG. 9, the decorative cap's sidewall has a height 8 so that the sidewall's bottom edge 9 extends below the vacuum stopper's rim 25 so as to partially cover the top of the wine bottle's neck, while not covering the bottle's barrel 49. As illustrated in FIGS. 9 and 10, where the wine bottle's neck 45 has a diameter greater than the diameter of the vacuum stopper's rim 25, preferably the cap's cavity's opening has a diameter greater than cavity's diameter at the vacuum stopper's rim, nearer to the cavity's top wall 11. More specifically, for this embodiment, the cavity 7 has a stepped construction including two diameters wherein the cavity diameter adjacent to the cavity's opening is larger than the diameter adjacent to the cavity's top wall, and is sufficient to accept the wine bottle's neck into the cap's cavity. For example, FIGS. 17-27 illustrate assemblies wherein the wine bottle's neck 45 has a diameter smaller than the diameter of the replaceable cap's rim 25. Thus, as illustrated in the Figures, for these assemblies the diameter of the cavity's cylindrical section may be uniform from the cavity's opening to the cavity's top wall 11. However, as illustrated in FIGS. 9 and 10, in the event that the wine bottle's neck 45 has a diameter larger than the diameter of the replaceable cap's rim 25, then it is preferred that the cavity's opening be larger, and have a diameter greater than the diameter of the cavity adjacent to the cavity's top wall.

In addition, the removable cap's sidewall 3 may be sized to provide a gaseous-tight seal with the vacuum stopper's upper portion's rim 25 so as to provide a redundant gaseous-tight seal to the one-way valve 33. The removable cap 1 may be made of any material known to those skilled in the art. However, preferably the removeable cap's top and sidewall are made from hard materials such as metal, stone, glass, plastic so as to maintain a press-fit engagement within the underlying vacuum stopper. Alternative, preferred materials for the removeable cap include rubber and/or foam which possess at least some rigidity and/or material memory, so as to return to their original shape after being deformed, so as to maintain a press-fit engagement within the underlying vacuum stopper 21. It is not intended that the replaceable cap be made of soft materials which do not possess material memory, such as papers and fabrics.

As illustrated in FIGS. 1-27, preferably the removeable cap 1 includes a decorative feature 13. The decorative feature can be any shape, size or color such as those illustrated in FIGS. 1, and 11-14. However, it is preferred that the decorative feature 13 provide an artistic and pleasing appearance so that the wine bottle can be displayed prominently even after the wine bottle has been opened. For example, in a preferred embodiment illustrated in FIGS. 1, 2 and 4, the removeable cap's decorative feature 13 consists of a sculpture of grapes. Alternative embodiments illustrated in FIGS. 11-14 include a sports theme, Christmas tree, birthday cake and animal figurines.

Figure 6:
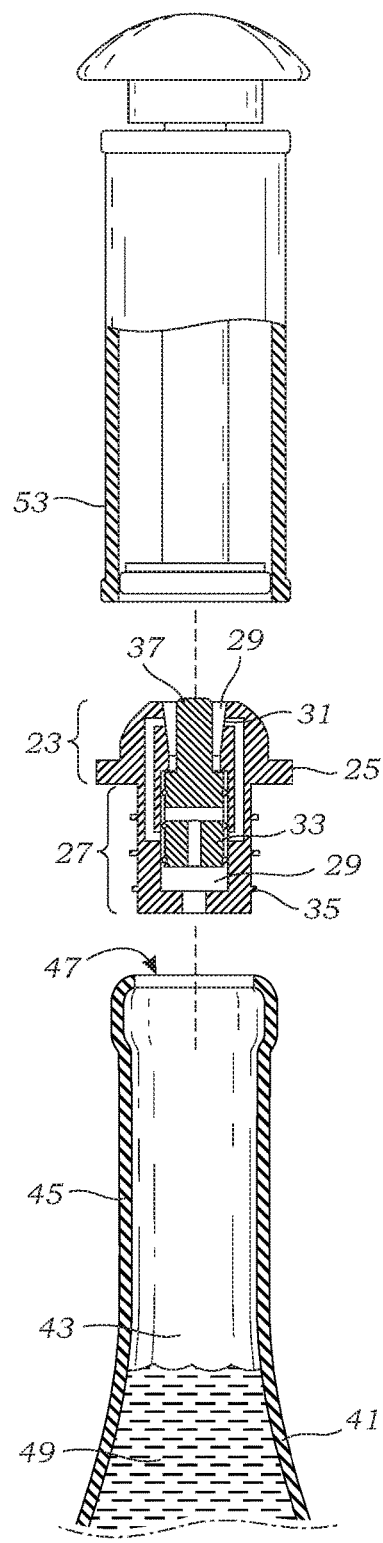
FIG. 6 is a side cross-sectional view illustrating insertion of a vacuum stopper into a wine bottle.
Figure 7:
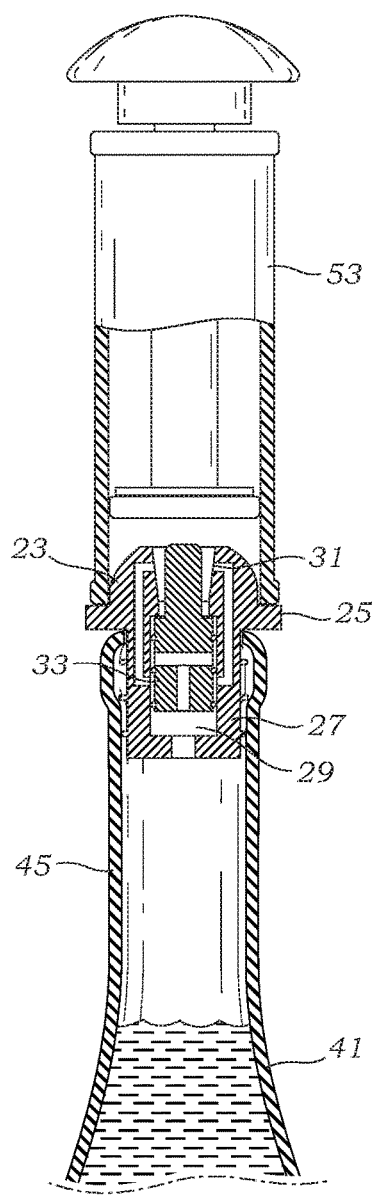
FIG. 7 is a side cross-sectional view illustrating a pump engaging a vacuum stopper within a wine bottle.
Figure 8:
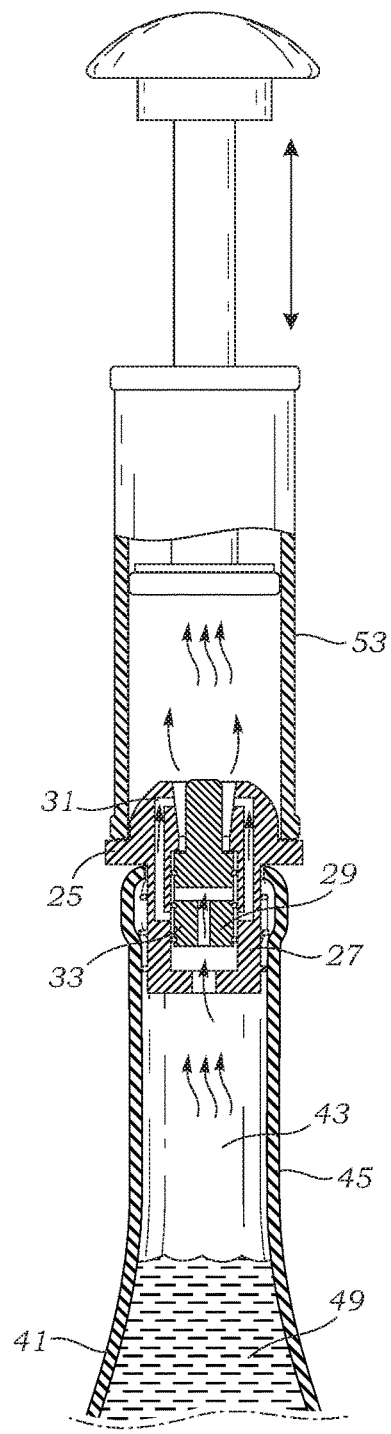
FIG. 8 is a side cross-sectional view illustrating activation of the pump so as to remove air from the wine bottle illustrated in FIG. 7.

As illustrated in FIGS. 6-7, the vacuum stopper 21 and removeable cap 1 are used in combination to seal an opened bottle of wine 41. As illustrated in FIG. 6, first the vacuum stopper's neck 27 is inserted into the bottle's opening 47. As illustrated in FIGS. 7 and 8, a pump 53 is utilized to evacuate air from the interior of the wine bottle. This is accomplished by engaging the pump's bottom edge to the vacuum stopper's rim 25 to provide a gaseous-tight seal. (See FIG. 7). Thereafter, the pump is actuated so as to pull air from the wine bottle through the vacuum stopper's central conduit 29 pass the vacuum stopper's one-way valve 33. (See FIG. 8). Once the air is evacuated, the pump 53 is removed and, as illustrated in FIGS. 9 and 10, the removeable cap 1 is then placed atop the vacuum stopper 21. To access the wine, these steps are reversed. The removeable cap 1 is removed from the vacuum stopper 21, and the vacuum stopper is withdrawn from the wine bottle's opening 47.

While several particular forms of the invention have been illustrated and described, it will be apparent that various modifications can be made without departing from the spirit and scope of the invention. Accordingly, it is not intended that the invention be limited except by the following claims.

I claim:

1. A wine bottle stopper for a wine bottle comprising:
a vacuum stopper including a neck portion, an upper portion extending above said neck portion, a conduit extending longitudinally through said neck portion and said upper portion, a one-way valve located within said conduit which freely permits air to flow upwardly through said conduit but inhibits air from flowing downwardly through said conduit, and a release button connected to said one-way valve whereby actuation of the release button causes said one-way valve to open, said release button extending upwardly from said upper portion, said neck portion having a diameter for entering and providing a seal with a bottle's circular opening, said upper portion having a longitudinally extending height and a laterally extending rim which is too large to enter into a bottle's circular opening; and
a removeable cap engaging and covering said vacuum stopper's upper portion, said cap having a top wall and a sidewall forming a central cavity, said cavity sized and having a height to entirely accept said vacuum stopper's upper portion including said rim and release button in said cavity, and said top wall having a recess sized and positioned to receive said release button.

2. The wine bottle stopper for a wine bottle of claim 1 wherein said recess is conically shaped.

3. The wine bottle stopper for a wine bottle of claim 1 wherein said recess is cylindrically shaped.

4. The wine bottle stopper for a wine bottle of claim 1 further comprising a decorative feature upon the exterior of said cap.

5. The wine bottle stopper for a wine bottle of claim 1 wherein said removable cap's cavity is sized to accept and cover said vacuum stopper's upper portion including its rim without said cap's sidewall extending below said rim.

6. The wine bottle stopper for a wine bottle of claim 1 wherein said removable cap's cavity is sized to accept and cover said vacuum stopper's upper portion including its rim with said cap's sidewall extending below said rim to at least partially cover a wine bottle's neck.

7. The wine bottle stopper for a wine bottle of claim 1 wherein said removable cap's cavity has two cylindrical sections including an upper cylindrical section sized to accept and cover said vacuum stopper's rim and a lower cylindrical section having a diameter greater than said upper section's diameter, said lower cylindrical section extending below said upper cylindrical section.

8. A wine bottle, vacuum stopper and removeable cap combination comprising:
a bottle having a chamber and a neck with a circular opening;
a vacuum stopper including a neck portion, an upper portion extending above said neck portion, a conduit extending longitudinally through said neck portion and said upper portion, a one-way valve located within said conduit which freely permits air to flow upwardly through said conduit but inhibits air from flowing downwardly through said conduit, and a release button connected to said one-way valve whereby actuation of the release button causes said one-way valve to open, said release button extending upwardly from said upper portion, said neck portion positioned within and providing a seal with said bottle's circular opening, said upper portion having a longitudinally extending height which forms the portion of the vacuum stopper which is exterior of said bottle's neck and a laterally extending rim which is too large to enter into said bottle's circular opening; and
a removeable cap engaging and covering said vacuum stopper's upper portion, said cap having a top wall and a sidewall forming a central cavity, said cavity sized and having a height to entirely accept said vacuum stopper's upper portion in said cavity, and said top wall having a recess sized and positioned to receive said release button; and
wherein said vacuum stopper's neck portion is positioned within said bottle's neck, said vacuum stopper's upper portion including rim and release button are within and completely covered by said removeable cap, and said vacuum stopper's release button is positioned within said top wall's circular recess.

9. The wine bottle, vacuum stopper and removeable cap combination of claim 8 wherein said recess is conically shaped.

10. The wine bottle, vacuum stopper and removeable cap combination of claim 8 wherein said recess is cylindrically shaped.

11. The wine bottle, vacuum stopper and removeable cap combination of claim 8 wherein said vacuum stopper's rim is round and said removable cap's sidewall is circular.

12. The wine bottle, vacuum stopper and removeable cap combination of claim 8 wherein said vacuum stopper's rim is square and said removable cap's sidewall is square.

13. The wine bottle, vacuum stopper and removeable cap combination of claim 8 wherein said vacuum stopper's rim and said removable cap's sidewall are sized and shaped to provide a gaseous tight seal between them.

14. The wine bottle, vacuum stopper and removeable cap combination of claim 8 wherein said removable cap's cavity is sized to accept and cover said vacuum stopper's upper portion including its rim without said cap's sidewall extending below said rim.

15. The wine bottle, vacuum stopper and removeable cap combination of claim 8 wherein said removable cap's cavity is sized to accept and cover said vacuum stopper's upper portion including its rim with said cap's sidewall extending below said rim so as to at least partially cover the top of said wine bottle's neck without cover said wine bottle's barrel.

16. The wine bottle, vacuum stopper and removeable cap combination of claim 8 wherein said removable cap's cavity has two cylindrical sections including an upper cylindrical section sized to accept and cover said vacuum stopper's rim and a lower cylindrical section which has a diameter greater than said upper cylindrical section's diameter, said lower cylindrical section extending below said upper cylindrical section to at least partially cover said wine bottle's neck.

17. A method of evacuating and storing wine in a wine bottle comprising the steps of:
provided a bottle having a chamber partially filled wine, said bottle having and a neck with a circular opening;
providing a vacuum stopper including a neck portion, an upper portion extending above said neck portion, a conduit extending longitudinally through said neck portion and said upper portion, a one-way valve located within said conduit which freely permits air to flow upwardly through said conduit but inhibits air from flowing downwardly through said conduit, and a release button connected to said one-way valve whereby actuation of the release button causes said one-way valve to open, said release button extending upwardly from said upper portion, said neck portion having a diameter shaped to enter and provide a seal with said bottle's circular opening, said upper portion having a longitudinally extending height and a laterally extending rim which is too large to enter into said bottle's circular opening;
providing a removeable cap for engaging and covering said vacuum stopper's upper portion, said cap having a top wall and a sidewall forming a central cavity, said cavity sized and having a height to entirely accept said vacuum stopper's upper portion in said cavity, and said top wall having a recess sized and positioned to receive said release button;
providing a pump capable of pumping air through vacuum stopper's conduit;
inserting said vacuum stopper's neck portion into said wine bottle's circular opening to form a gaseous seal between said vacuum stopper and said wine bottle's neck, said vacuum stopper's upper portion extending longitudinally exterior of said bottle's neck;
evacuating air from said bottle by pumping air through vacuum stopper's conduit; and
completely covering said vacuum stopper's upper portion including rim and release button with said removeable cap by placing said removeable cap upon said vacuum stopper's upper portion wherein said release button is positioned within said top wall's circular recess.

18. The method of evacuating and storing wine in a wine bottle of claim 17 wherein said recess is conically shaped.

19. The method of evacuating and storing wine in a wine bottle of claim 17 wherein said recess is cylindrically shaped.

20. The method of evacuating and storing wine in a wine bottle of claim 17 wherein said removable cap's cavity is sized to accept and cover said vacuum stopper's upper portion including its rim with said cap's sidewall extending below said rim so as to partially cover the top of said wine bottle's neck while not covering the bottom of said wine bottle's neck.

* * * * *